United States Patent
Chen

(10) Patent No.: US 10,787,226 B1
(45) Date of Patent: Sep. 29, 2020

(54) MODULARIZED CLIPLESS PEDAL FOR MOUNTAIN BIKE

(71) Applicant: Yong-Fu Chen, Taichung (TW)

(72) Inventor: Yong-Fu Chen, Taichung (TW)

(73) Assignee: SCADA INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 16/584,804

(22) Filed: Sep. 26, 2019

(51) Int. Cl.
*B62M 3/08* (2006.01)

(52) U.S. Cl.
CPC .................. *B62M 3/086* (2013.01)

(58) Field of Classification Search
CPC .................. B62M 3/086; B62M 3/08
See application file for complete search history.

(56) References Cited

U.S. PATENT DOCUMENTS 7,856,905 B2 * 12/2010 Hsieh .................. B62M 3/086
74/594.4

* cited by examiner

*Primary Examiner* — Vicky A Johnson

(57) ABSTRACT

A pedal includes a pedal body and a step-in assembly. The step-in assembly has a projected area less than that of the pedal body and is fixed on a platform of the pedal body. The step-in assembly has a frame with a U-shape, a front fastener integrally formed at a closed end of the frame in one-piece, and a rear fastener pivotedly connected to an open end of the frame. A protrusion is aslant extended from each of two opposite sides of the frame. The two protrusions are symmetrically arranged to face to each other.

5 Claims, 7 Drawing Sheets

MODULARIZED CLIPLESS PEDAL FOR MOUNTAIN BIKE

TECHNICAL FIELD

The invention relates to bike pedals, particularly to mountain bike clipless pedals.

RELATED ART

Recently, a step-in or clipless pedal, which releasably engages a cleat secured to a sole of a bike rider's shoe, has become popular. The clipless pedal has a pedal spindle that can be mounted on a crank of a bicycle, a pedal body that is rotatably supported on this pedal spindle, and a cleat engagement mechanism. In an off road bike (also known as mountain bike) pedal, a cleat engagement mechanism is formed on both sides of the pedal body for engaging a cleat. In this type of bicycle pedals, a rider steps onto the pedal and the cleat engagement mechanism automatically grips on to the cleat secured to the bottom of the rider's shoe. In detail, the cleat engagement mechanism in a mountain bike pedal includes a fixed front fastener and a movable rear fastener.

When attaching the rider's shoe to the step-in or clipless pedal through the cleat, the rider moves his or her shoe obliquely downwardly and forwardly relative to the pedal body such that the front end of the cleat engages a front fastener of the pedal body. Once the front end of the cleat is engaged with the front fastener of the pedal body, the rider places the rear end of the cleat in contact with a guide portion of the rear fastener of the pedal body. In this position, the rider presses his or her shoe downward against the pedal to cause the rear fastener to initially pivot rearward against the force of a spring to move the rear fastener to a cleat releasing position. The rear end of the cleat then enters a position opposite a back face of the rear fastener. Then, the rear fastener returns under the force of a biasing member or spring so that the rear fastener engages the rear end of the cleat.

When releasing the shoe from the pedal, the rider must turn his or her shoe about an axis substantially perpendicular to the tread of the pedal, using the front end of the cleat as a pivoting point. As a result of this pivoting action, the rear fastener is pivoted rearward against the force of the spring to a cleat releasing position to release the shoe. It is important that the cleat does not inadvertently release the pedal during normal pedaling. Some of these prior step-in or clipless pedals might not release the cleat when a rider is disengaging because of insufficiency of mechanical accuracy between the cleat and the cleat engagement mechanism.

SUMMARY OF THE INVENTION

An object of the invention is to provide a modularized clipless pedal for a mountain bike, which makes a cleat easier to escape from a step-in assembly when the cleat is rotated outward to disengage.

To accomplish the above object, the modularized clipless pedal for a mountain bike of the invention includes a pedal body and a step-in assembly. The step-in assembly has a projected area less than that of the pedal body and is fixed on a platform of the pedal body. The step-in assembly has a frame with a U-shape, a front fastener integrally formed at a closed end of the frame in one-piece, and a rear fastener pivotedly connected to an open end of the frame. A protrusion is aslant extended from each of two opposite sides of the frame. The two protrusions are symmetrically arranged to face to each other.

DETAILED DESCRIPTION OF THE INVENTION

Figure 1:
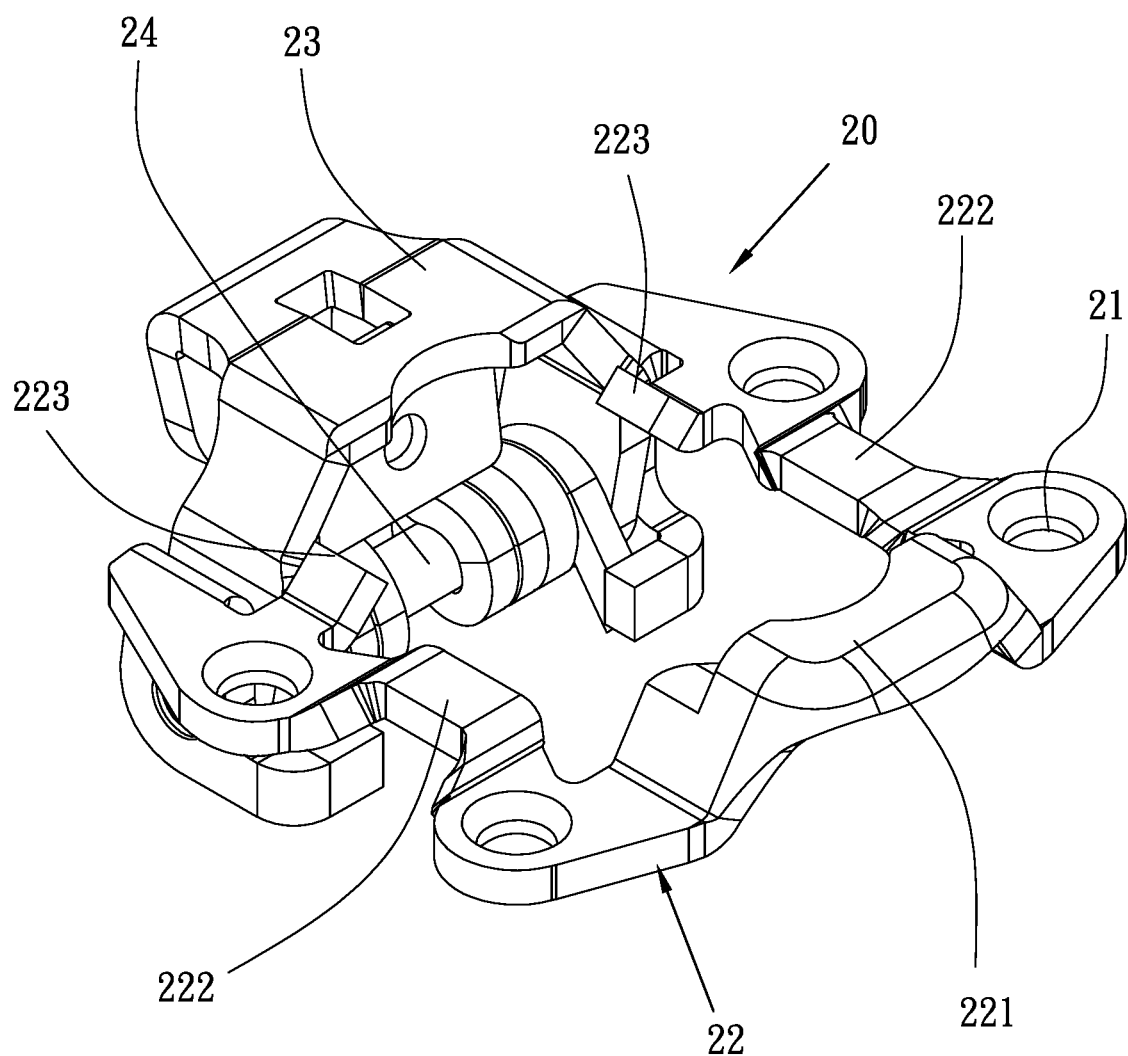
FIG. 1 is a perspective view of the step-in assembly of the first embodiment of the invention.
Figure 2:
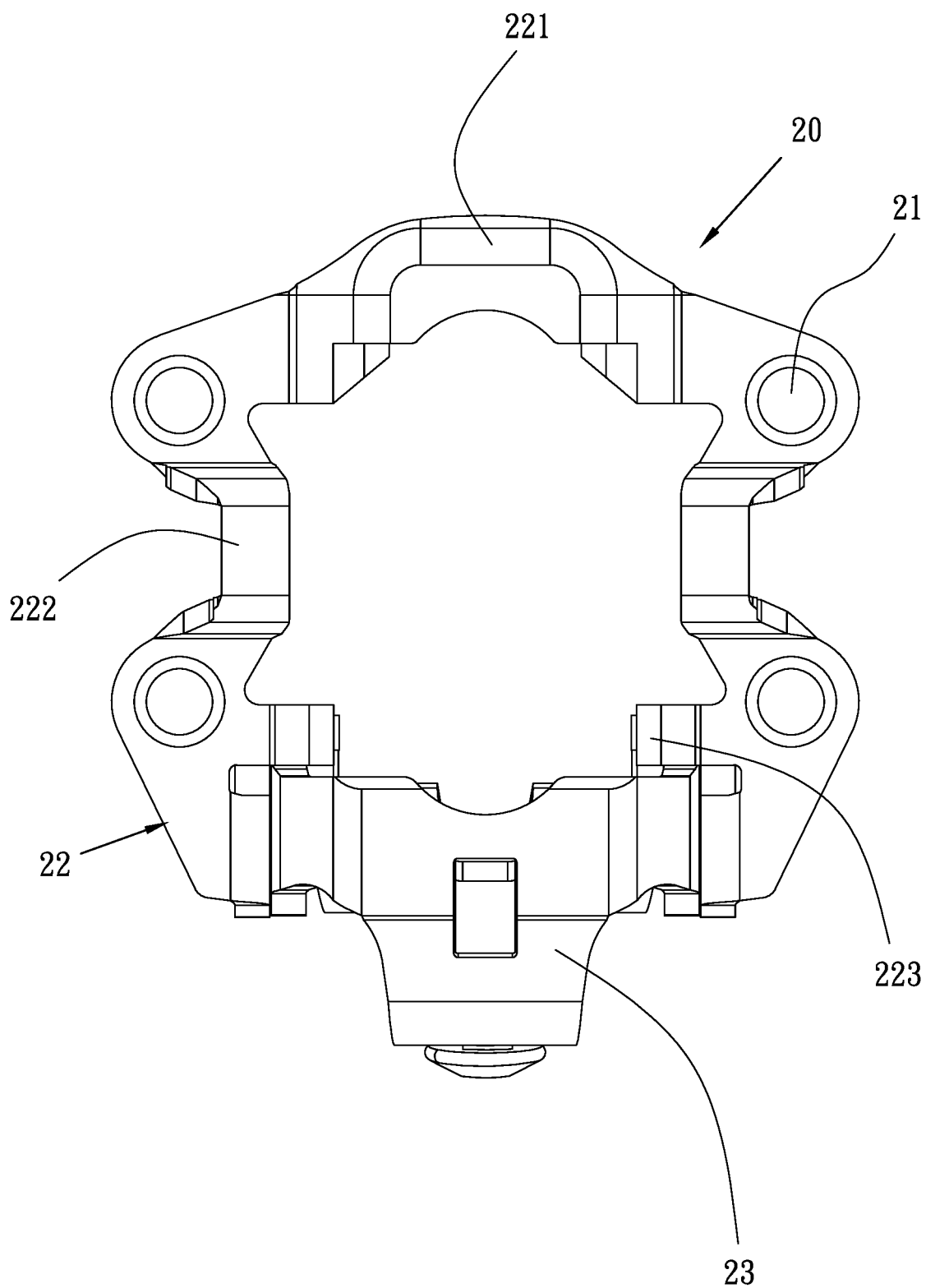
FIG. 2 is a top plan view of the step-in assembly of the first embodiment of the invention.

Please refer to FIGS. 1-5. The invention provides a modularized clipless pedal for a mountain bike which includes a pedal body 30 and a step-in assembly 20. A clipless pedal for a mountain bike has an obvious feature in contour, which is that the pedal body 30 is much larger than the step-in assembly 20 in projected area. The pedal body 30 has two platforms on two sides thereof. The step-in assembly 20 is fixed on one of the two platforms of the pedal body 30. The pedal body 30 is provided with threaded holes 31 and the step-in assembly 20 is provided with through holes 21 separately corresponding to the threaded holes 31 in position. Thus, the step-in assembly 20 can be fixed on the pedal body 30 by separately inserting bolts 40 into the through holes 21 and separately screwing the bolts 40 in the threaded holes 31. In this embodiment, each of the numbers of the through holes 21 and the threaded holes 31 is four.

The step-in assembly 20 has a frame 22 with a U-shape. The U-shaped frame 22 has an open end, a closed end and two opposite sides 222 between the open end and the closed end. The closed end is arranged forward and the open end is arranged rearward. The forward and forward directions means to face a front wheel and a rear wheel of a bike. A front fastener 221 is integrally formed at the closed end of the frame 22 in one-piece. The front fastener 221 is used for fastening a cleat 50. A rear fastener 23 is pivotedly connected to the open end of the frame 22 by a shaft 24.

A protrusion 223 is aslant extended from an inner edge of each of the two opposite sides 222 of the frame 22. The two protrusions 223 are symmetrically arranged to face to each other. The two symmetric protrusions 223 make step-in assembly 20 able to be assembled with a left pedal body or a right pedal body without directionality.

Figure 3:
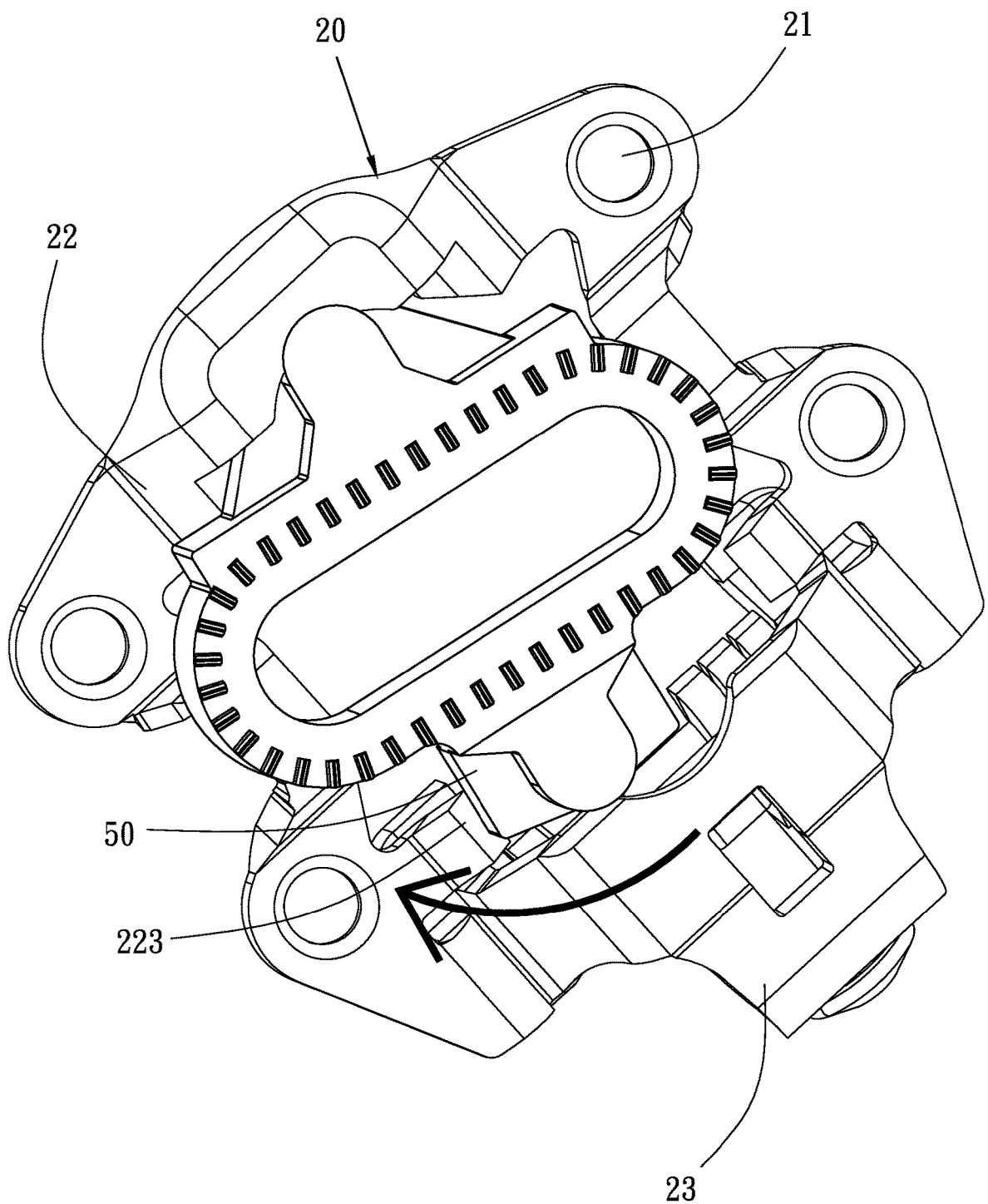
FIG. 3 is a schematic view showing the operating relationship between the protrusion and the cleat of the first embodiment of the invention.
Figure 4:
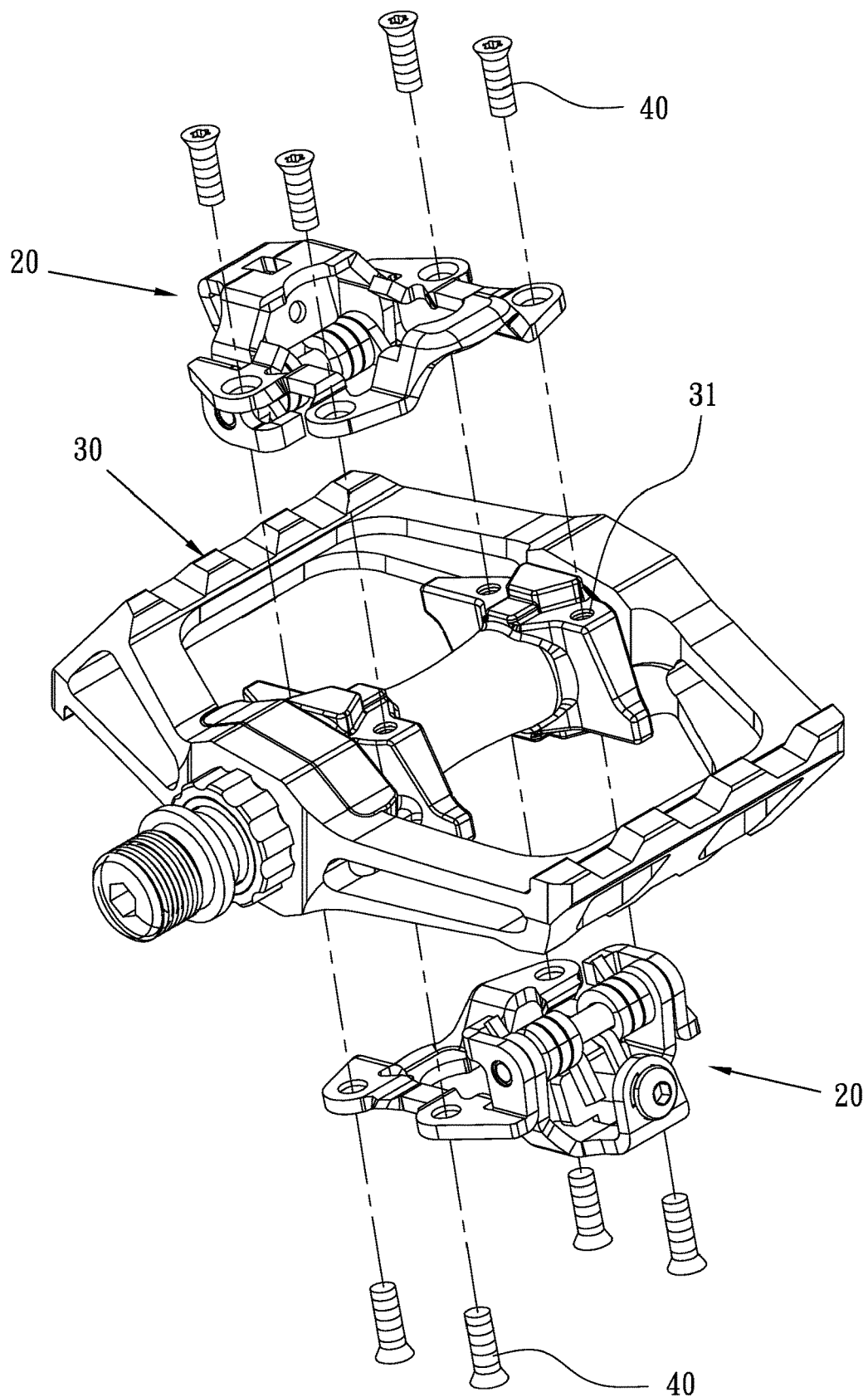
FIG. 4 is an exploded view of the first embodiment of the invention.
Figure 5:
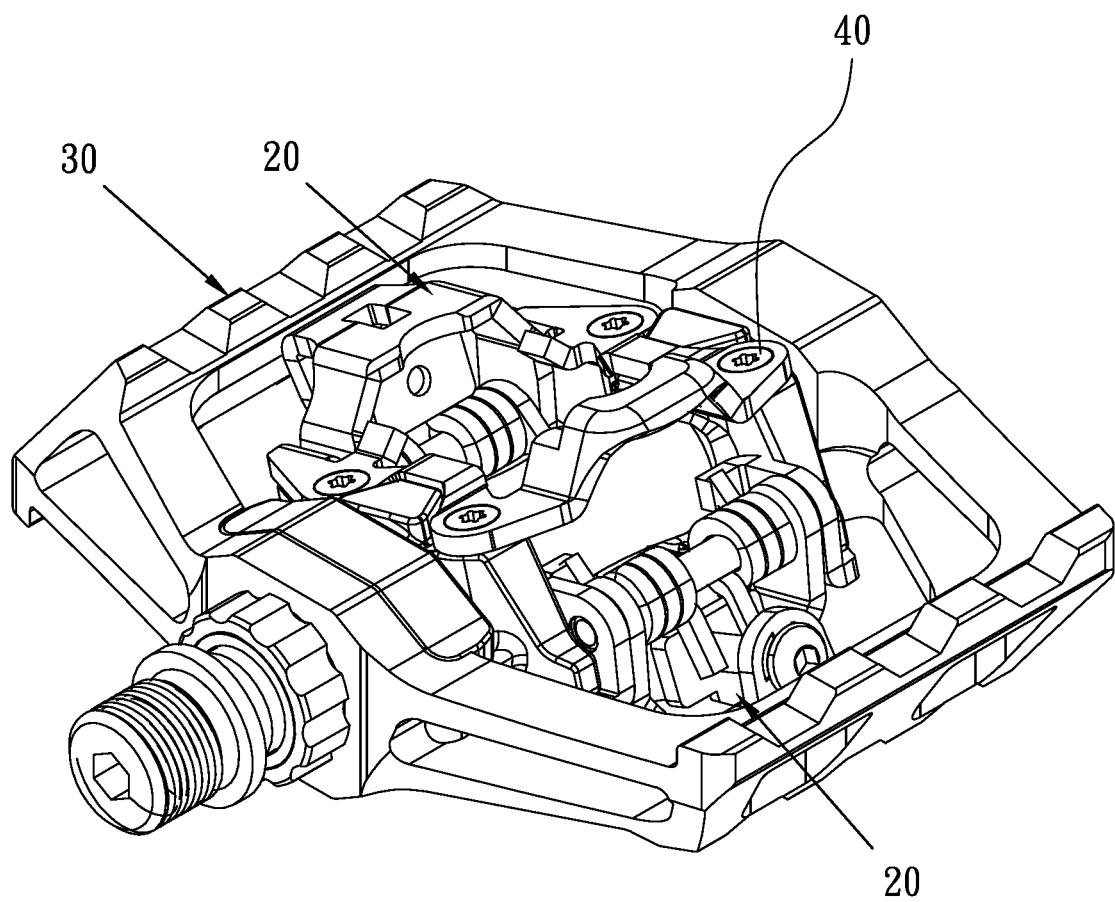
FIG. 5 is an assembled view of the first embodiment of the invention.

Please refer to FIG. 3. When a cleat 50 is rotated outward, the protrusions 223 can guide the cleat 50 to rotate more smoothly. This makes the cleat 50 easier to escape from the step-in assembly 20.

Figure 6:
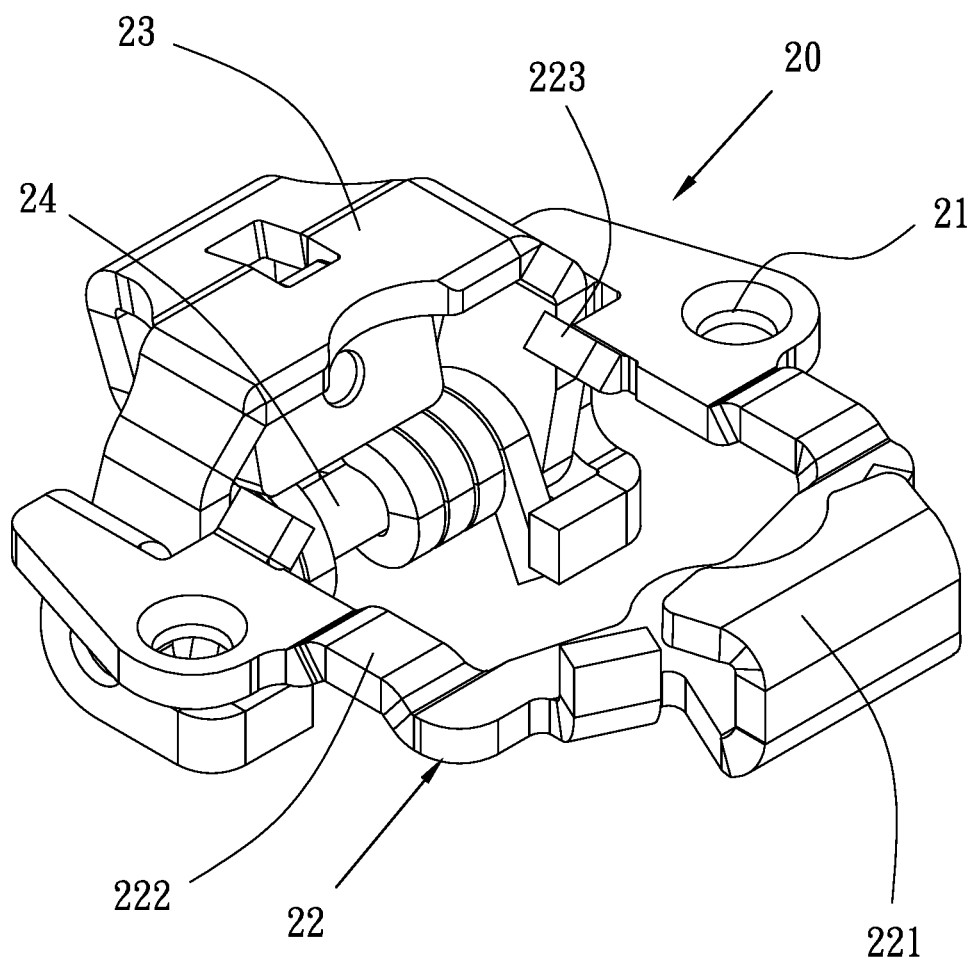
FIG. 6 is a perspective view of the step-in assembly of the second embodiment of the invention.
Figure 7:
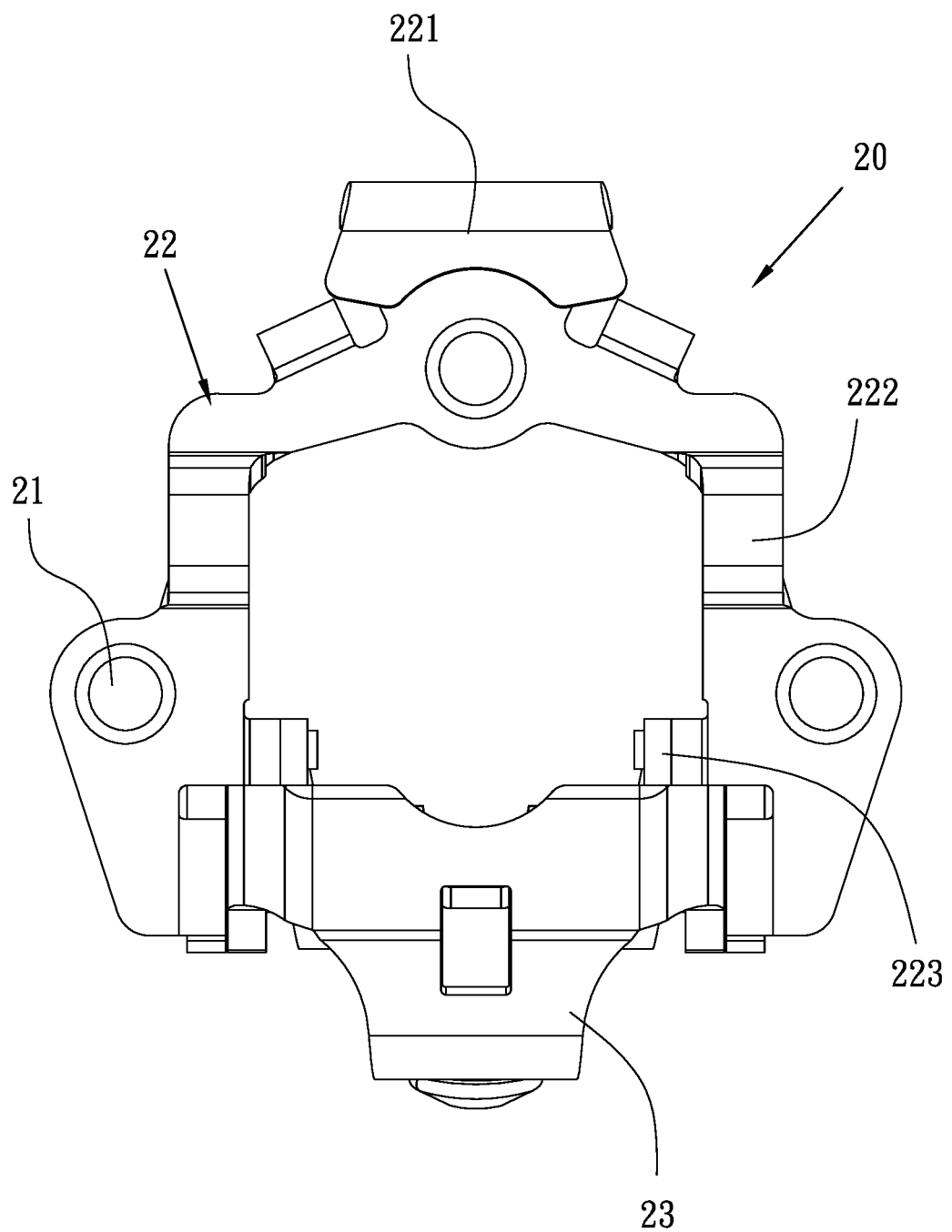
FIG. 7 is a top plan view of the step-in assembly of the second embodiment of the invention.

Please refer to FIGS. 6-7, which shows another embodiment of the invention. In this embodiment, all are the same as the abovementioned embodiment except the numbers of the through holes 21 and the threaded holes 31. In this embodiment, each of the numbers of the through holes 21 and the threaded holes 31 is three.

The step-in assembly 20 is mounted on the pedal body 30 by bolts 40, so all components of the step-in assembly 20 can be made with high accuracy. Also, because the protrusions 223 and the frame 22 are formed in one-piece, the former can be made with high accuracy.

It will be appreciated by persons skilled in the art that the above embodiments have been described by way of example only and not in any limitative sense, and that various alterations and modifications are possible without departure from the scope of the invention as defined by the appended claims.

What is claimed is:

1. A modularized clipless pedal for a mountain bike, comprising:
    a pedal body; and
    a step-in assembly, having a projected area less than that of the pedal body, fixed on a platform of the pedal body, and having a frame with a U-shape, a front fastener integrally formed at a closed end of the frame in one-piece, and a rear fastener pivotedly connected to an open end of the frame;
    wherein a protrusion is aslant extended from each of two opposite sides of the frame, and the two protrusions are symmetrically arranged to face to each other and protrude from a locking plane formed by the front fastener and the rear fastener.

2. The modularized clipless pedal of claim 1, wherein the pedal body is provided with threaded holes, the step-in assembly is provided with through holes separately corresponding to the threaded holes in position, the step-in assembly is fixed on the pedal body by separately inserting bolts into the through holes and separately screwing the bolts in the threaded holes.

3. The modularized clipless pedal of claim 2, wherein the through holes are four in number and the threaded holes are four in number.

4. The modularized clipless pedal of claim 2, wherein the through holes are three number and the threaded holes are three in number.

5. The modularized clipless pedal of claim 1, wherein each of the protrusions is extended from an inner edge of each of the two opposite sides of the frame.

* * * * *